United States Patent
Chippendale

(10) Patent No.: US 12,459,163 B2
(45) Date of Patent: Nov. 4, 2025

(54) METHOD OF MAKING A COMPOSITE MOULD TOOL AND REPAIRING METHOD OF A COMPOSITE MOULD TOOL

(71) Applicant: BAE Systems plc, London (GB)

(72) Inventor: John Chippendale, Blackburn (GB)

(73) Assignee: BAE Systems plc, London (GB)

( * ) Notice: Subject to any disclaimer, the term of this patent is extended or adjusted under 35 U.S.C. 154(b) by 219 days.

(21) Appl. No.: 18/567,438

(22) PCT Filed: Jun. 15, 2022

(86) PCT No.: PCT/GB2022/051513
§ 371 (c)(1),
(2) Date: Dec. 6, 2023

(87) PCT Pub. No.: WO2022/263825
PCT Pub. Date: Dec. 22, 2022

(65) Prior Publication Data
US 2024/0269900 A1    Aug. 15, 2024

(30) Foreign Application Priority Data

Jun. 18, 2021  (EP) .................................... 21275085
Jun. 18, 2021  (GB) .................................... 2108724

(51) Int. Cl.
*B29C 33/38*    (2006.01)
*B29C 33/56*    (2006.01)
(Continued)

(52) U.S. Cl.
CPC .......... *B29C 33/38* (2013.01); *B29C 33/3857* (2013.01); *B29C 33/56* (2013.01);
(Continued)

(58) Field of Classification Search
CPC ......... B29C 33/38; B29C 33/56; B29C 33/74; B29C 2033/3864
See application file for complete search history.

(56) References Cited

U.S. PATENT DOCUMENTS

| 9,635,714 B2 | 4/2017 | Matsen |
| 2007/0281176 A1 | 12/2007 | Palumbo |
| 2010/0151262 A1 | 6/2010 | Corden |

FOREIGN PATENT DOCUMENTS

| EP | 3095711 A1 | 11/2016 |
| EP | 3275637 A1 | 1/2018 |

(Continued)

OTHER PUBLICATIONS

Translation of WO-2009145595-A2 (Year: 2009).*
(Continued)

*Primary Examiner* — John J DeRusso
(74) *Attorney, Agent, or Firm* — Maine Cernota & Curran

(57) ABSTRACT

A method of manufacturing, at least in part, a composite mould tool is described. At S101, the method comprises obtaining a mould tool precursor having a first face and a reverse second face, wherein the precursor comprises a first metal. At S102, the method comprises hermetically sealing the precursor by cold spraying a layer on the second face using particles comprising a second metal, wherein the respective coefficients of thermal expansion of the first metal and the second metal are within a factor of 5. At S103, the method comprises providing a faceplate of the composite mould tool by subtractive manufacturing of the first face.

15 Claims, 2 Drawing Sheets

(51) Int. Cl.
  *B29C 33/74* (2006.01)
  *B29L 31/00* (2006.01)
  *C22C 38/08* (2006.01)
  *C23C 24/04* (2006.01)
  *B29C 70/30* (2006.01)

(52) U.S. Cl.
  CPC ...... *B29C 33/74* (2013.01); *B29C 2033/3864* (2013.01); *B29C 70/30* (2013.01); *B29L 2031/757* (2013.01); *C22C 38/08* (2013.01); *C23C 24/04* (2013.01)

(56) References Cited

FOREIGN PATENT DOCUMENTS

| JP | 2004306120 A | 11/2004 | | |
|---|---|---|---|---|
| JP | 2009083429 A | 4/2009 | | |
| JP | 2009126066 A | 6/2009 | | |
| JP | 2013147717 A | * | 8/2013 | |
| JP | 2014037096 A | 2/2014 | | |
| KR | 20060126293 A | 12/2006 | | |
| WO | 2005012589 A1 | 2/2005 | | |
| WO | WO-2009145595 A2 | * | 12/2009 | ......... B29D 30/0061 |

OTHER PUBLICATIONS

Translation of JP-2013147717-A (Year: 2013).*
Extended European Search Report for Application No. 21275085.5 mail date Oct. 14, 2021, 11 pages.
Sun Wen et al: "Post-Process Treatments on Supersonic Cold Sprayed Coatings: A Review", Coatings, vol. 10, No. 2, Feb. 1, 2020 (Feb. 1, 2020), p. 123, XP055848254, CH ISSN: 2079-6412, DOI: 10.3390/coatings10020123, Retrieved from the Internet: URL: http://dx.doi.org/10.3390/coatings10020123 [retrieved on Oct. 5, 2021].
International Search Report and Written Opinion for International Application No. PCT/GB2022/051513 md Jul. 13, 2022, 15 pages.
GB Search Report for Application No. GB2108724.2 mail date Mar. 22, 2022, 4 pages.
Combined Search and Examination Report for Application No. GB2208802.5 mail date Dec. 6, 2022, 7 pages.

* cited by examiner

METHOD OF MAKING A COMPOSITE MOULD TOOL AND REPAIRING METHOD OF A COMPOSITE MOULD TOOL

RELATED APPLICATIONS

This application is a national phase application filed under 35 USC § 371 of PCT Application No. PCT/GB2022/051513 with an International filing date of Jun. 15, 2022, which claims priority of GB Patent Application 2108724.2 filed Jun. 18, 2021 and EP patent application Ser. No. 21/275,085.5 filed Jun. 18, 2021. Each of these applications is herein incorporated by reference in its entirety for all purposes.

FIELD OF THE INVENTION

The present invention relates to composite mould tools.

BACKGROUND

Composite parts, for example carbon fibre composite (CFC) parts and glass fibre reinforced plastic (GRP) parts, are typically formed in mould tools (also known as moulds, tools, layup moulds, layup tools). However, a problem arises in that lack of vacuum integrity of mould tools, particularly of hard tooling mould tools, is apparent generally only after manufacturing thereof and/or may arise during use.

EP 3 275 637 A1 describes a composite lay up tool comprising a metal faceplate (12) on a support member (13), wherein the faceplate has been formed by cold-gas dynamic spraying of particles of the metal onto a substrate and wherein the support member is compatible with the faceplate and comprises a casting of a ceramic composition. EP 3 095 711 B1 describes a method for (i) repairing a structural weakness, or (ii) preventing or inhibiting the initiation of a structural weakness, or (iii) preventing or inhibiting the progression of a structural weakness in an aircraft frame element. SUN WEN ET AL "Post-Process Treatments on Supersonic Cold Sprayed Coatings: A Review", Coatings, vol. 10, no. 2, 1 Feb. 2020, page 123 describes different post process treatments on cold sprayed deposits.

Hence, there is a need to improve composite mould tools

SUMMARY OF THE INVENTION

It is one aim of the present invention, amongst others, to provide a method of manufacturing, at least in part, a composite mould tool which at least partially obviates or mitigates at least some of the disadvantages of the prior art, whether identified herein or elsewhere.

A first aspect provides a method of manufacturing, at least in part, a composite mould tool, the method comprising:
  obtaining a mould tool precursor having a first face and a reverse second face, wherein the precursor comprises a first metal;
  hermetically sealing the precursor by cold spraying a layer on the second face using particles comprising a second metal, wherein the respective coefficients of thermal expansion of the first metal and the second metal are within a factor of 5; and
  providing a faceplate of the composite mould tool by subtractive manufacturing of the first face.

A second aspect provides a method of repairing a composite mould tool having a faceplate provided by a first face and a reverse second face, wherein the tool comprises a first metal, the method comprising:
  hermetically sealing the composite mould tool by cold spraying a layer on the second face using particles comprising a second metal, wherein the respective coefficients of thermal expansion of the first metal and the second metal are within a factor of 5.

A third aspect provides composite mould tool having a faceplate provided by a first face and a reverse second face, wherein the tool comprises a first metal, wherein the tool comprises a cold sprayed, hermetically sealing layer on the second face, wherein the layer comprises a second metal, wherein the respective coefficients of thermal expansion of the first metal and the second metal are within a factor of 5.

A fourth aspect provides use of a cold sprayed Fe—Ni alloy layer on a reverse second face of a Fe—Ni alloy composite mould tool, having a faceplate provided by a first face and the reverse second face, to hermetically seal the tool.

A fifth aspect provides a method of forming a composite part comprising manufacturing, at least in part, a corresponding composite mould tool according to the first aspect, repairing a corresponding composite mould tool according to the second aspect or using a corresponding composite mould tool according to the third aspect.

DETAILED DESCRIPTION

According to the present invention there is provided a method of manufacturing, at least in part, a composite mould tool, as set forth in the appended claims. Also provided is a method of repairing a composite mould tool, a composite mould tool and use of use of a cold sprayed Fe—Ni alloy layer to hermetically seal a composite mould tool, as set forth in the appended claims. Other features of the invention will be apparent from the dependent claims, and the description that follows.

Method of Manufacturing

The first aspect provides a method of manufacturing, at least in part, a composite mould tool, the method comprising:
  obtaining a mould tool precursor having a first face and a reverse second face, wherein the precursor comprises a first metal;
  hermetically sealing the precursor by cold spraying a layer on the second face using particles comprising a second metal, wherein the respective coefficients of thermal expansion of the first metal and the second metal are within a factor of 5; and
  providing a faceplate of the composite mould tool by subtractive manufacturing of the first face.

In this way, the cold sprayed layer on the second face hermetically seals the mould tool precursor, thereby remediating and/or safeguarding against through-thickness and/or interconnected cracks and/or porosity in the mould tool precursor thereunder. In other words, the cold sprayed layer provides a hermetic sealing layer on the second face of the precursor. It should be understood that this layer does not have through-thickness and/or interconnected cracks and/or porosity, being a hermetic sealing layer (i.e. gas tight, non-porous, impermeable, non-perforated). In contrast with conventional methods of repairing through-thickness and/or interconnected cracks and/or porosity such as by welding, the cold spraying is a solid state process, not introducing deleterious distortion and/or residual stresses. Since the hermetic sealing layer is applied on the reverse second face (c.f. the first face providing the faceplate), the first face is unaffected by the cold spraying. It should be understood that the reverse second face is on the reverse or opposed side of the composite mould tool with respect to the first face. Typically, the first face is the inner face of the composite mould tool and the reverse second face is the outer face of the composite mould tool. In this way, the cold spraying may be performed before and/or after providing the faceplate by subtractive manufacturing of the first face. Since the respective coefficients of thermal expansion of the first metal and the second metal are within a factor of 5 (or within a factor of 4, a factor of 3, a factor of 2, a factor of 1.5, a factor of 1.4, a factor of 1.3, a factor of 1.2, a factor of 1.1), for example having similar CTEs, differential distortion during thermal cycling due to a bimetallic CTE mismatch is reduced and/or avoided. That is, the method ensures vacuum integrity of metallic composite mould tools through deposition of a matched material layer via cold spray. The thermal expansion of the first and the second metal may be the same (i.e. they may have the same CTE).

In more detail, forming of a composite part typically includes a cycle of cutting (for example of fabric plies), lamination and polymerization. During lamination, a release agent is usually applied to the faceplate (also known as mould surface) to prevent adhesion between the composite part to be formed and the mould tool. Optionally, a peel-ply is first laid in the mould tool. Fibre plies are subsequently laid up in the mould tool, manually and/or automatically, to form a laminate and optionally, another peel-ply is last laid in the mould. A series of further layers is added above the laminate: a release film (to separate the laminate from the other layers while allowing excess resin to pass therethrough); a bleeder (to absorb excess resin); a barrier (to separate the bleeder from a breather thereabove); a breather (to distribute the vacuum homogeneously among the external surfaces and to avoid the folds of a vacuum bag to be transferred to the laminate); and a vacuum bag (to maintain a vacuum created with a vacuum pump). Also included are valves and sealant to hermetically seal the vacuum bag. Polymerization is then performed at room temperature or at elevated temperatures, under vacuum. Polymerization at elevated temperatures, for example in an autoclave, provides composite parts having relatively superior mechanical properties. Hence, the mould tool requires vacuum integrity, including at elevated temperatures. For polymerization at room temperature, for prototype parts and/or when dimensional accuracy and/or surface finish are relatively less important, soft tooling mould tools may be made from materials such as fiberglass, high-density foams, machinable epoxy boards or even clay or wood/plaster models. For repeated cycles (typically 10 to 100 cycles) and/or when dimensional accuracy and/or surface finish are relatively more important, mould tools made from CFC, monolithic graphite, castable graphite, ceramics or metals such as aluminium alloys. For enhanced durability and/or longevity such as many repeated cycles (typically more than 100 to 1000 s) and/or when dimensional accuracy and/or surface finish are relatively most important, hard tooling is used, being the most durable but also most costly. Hard tooling mould tools are typically made from metals for example steel, aluminium alloys and/or relatively costly iron-nickel alloys, such as Invar, the latter being both durable and having coefficients of thermal expansion (CTE) similar to that of the composite parts, for example CFC parts, and thus better maintain dimensional accuracy during thermal cycling during polymerization. Particularly, CTE mismatch between relatively less costly aluminium alloys and composite parts during thermal cycling may preclude use thereof for forming some composite parts. Hard tooling mould tools are typically manufactured via computer numerical control (CNC) machining (i.e. subtractive manufacturing) of castings, welded fabrications or from billet materials, for example, to tolerances better than 50 µm over 10 m. Egg crates may be used for structural support. Hybrid hard tooling mould tools combines metal face plates with typically composite structural reinforcement, to reduce a mass and/or a cost thereof while exploiting the relative advantages of hard tooling mould tools in respect of durability, longevity, dimensional accuracy and/or surface finish. Machining and polishing iron-nickel alloys is particularly costly and complex, requiring specialist toolmakers. However, a problem arises in that lack of vacuum integrity of mould tools, particularly of hard tooling mould tools, is apparent generally only after manufacturing thereof and/or may arise during use. For example, through-thickness and/or interconnected cracks and/or porosity compromise vacuum integrity. Such cracks and/or porosity may be caused and/or revealed by the manufacturing. Conventional methods of repairing such cracks and/or porosity, typically by welding, are costly, complex and may result in distortion of the mould tools, thereby necessitating repeated or remedial machining if even possible, while may also be unsuccessful. For example, porosity of a casting may be extensive while cracking in a weld of a fabrication may propagate during repair thereof. Additionally and/or alternatively, the repairs may be defective. Hence, repair of defective mould tools is often not economically viable, despite their substantial manufacturing cost and complexity.

Manufacturing

The method is of manufacturing, at least in part, the composite mould tool (i.e. a mould tool for moulding composite parts, for example a mould tool for moulding aerospace composite parts). Conventional composite mould tools are known. It should be understood that manufacturing of the composite mould tool may include other steps, for example fabrication of the mould tool precursor, pre-machining of the mould tool precursor, attachment of an egg crate and/or polishing of the faceplate. Other steps are known.

In one example, the method of manufacturing comprises and/or is a method of manufacturing a new (i.e. not previously used, virgin) mould tool. In this way, vacuum integrity of the mould tool may be better guaranteed. In one example, the method of manufacturing comprises and/or is a method of repairing, remanufacturing or restoring an existing (i.e. not having vacuum integrity, defective, used) mould tool. In this way, existing mould tools may be repaired, remanufactured or restored, thereby extending longevity thereof Composite Mould Tool In one example, the composite mould tool comprises and/or is a hard tooling mould tool or a hybrid hard tooling mould tool. That is, the method of manufacturing is amenable to both tooling and hybrid tooling. Furthermore, the method of manufacturing may be amenable for some soft tooling, depending on the materials.

In one example, the composite mould tool is a single-sided (also known as open) mould tool or a part of a closed mould tool. That is, the method of manufacturing is amenable to both single-sided and closed mould tools.

In one example, the composite mould tool is for an aerospace component, for example fuselage, wings and/or empennage, for example having a dimension of at least 1, 2, 3, 4, 5, 6, 7, 8, 9, 10 m or more and/or having a dimensional tolerance within 500, 250, 100, 50 or 25 µm. That is, the composite part is a high-value part and is relatively large and/or has relatively demanding dimensional accuracy requirements.

In one example, the composite mould tool is suitable for forming CFC parts. That is, the composite mould tool maintains dimensional accuracy during thermal cycling during polymerization of the CFC parts, for example.

Precursor

The method comprises obtaining the mould tool precursor having the first face and the reverse second face.

It should be understood that the mould tool precursor comprises and/or is the mould tool before the layer is cold sprayed on the second face. It should be understood that the face plate (also known as mould surface) is provided from the first face of the mould tool precursor. It should be understood that the second face, being the reverse face, is also known as the back face. It should be understood that through-thickness and/or interconnected cracks and/or porosity through the mould tool precursor compromise vacuum integrity. In one example, the precursor comprises a perforation, for example a through-thickness and/or an interconnected crack and/or porosity, extending between the first face and the second face. In one example, the mould tool comprises a perforation, for example a through-thickness and/or an interconnected crack and/or porosity, extending between the face plate and the second face.

In one example, obtaining the precursor comprises casting, thermomechanically forming and/or fabricating from the first metal. For example, precursors such as billets and plates may be formed, at least in part, by continuous casting and/or by hot and/or cold rolling (i.e. thermomechanically forming). For example, precursors may be formed, at least in part, by forging (i.e. thermomechanically forming). For example, precursors may be formed, at least in part, by welding plates.

First Metal

The precursor comprises the first metal. In one example, the precursor is formed, at least in part, from the first metal, for example from a casting, a billet and/or a plate thereof. In one example, the precursor does not comprise and/or is not of a ceramic composition. In one example, the precursor does not comprise and/or is not a casting of a ceramic composition.

In one example, the first metal comprises and/or is an Fe—Ni alloy, for example comprising Ni in an amount from about 30 wt. % to 45 wt. % by weight of the alloys, optionally one or more alloying additions, with a balance of Fe and unavoidable impurities. Such Fe—Ni have relatively low CTEs, similar to those of composites such as CFC, thereby reducing CTE mismatch therebetween.

In one example, the first metal comprises and/or is Invar 36 or equivalent (complying with current versions of ASTM B388, DIN 1.3912, UNS K93600, MIL I-16598, MIL I-23011 Class 7, WS 1.3912), Invar 42 or equivalent (complying with current versions of ASTM F30, UNS K94100, DIN 1.3917, NF A54-301) or similar.

Invar 36 has one of the lowest thermal expansion of all alloys and metals and a near zero CTE between room temperature (20° C.) and 230° ° C. (less than $1.3\times10^{-6}$ $K^{-1}$). Invar 36 is typically used for hard tooling for thermal cycling up to 250° C., such as for CFC parts, to meet technical advances in high temperature CFC parts having curing temperatures in excess of 200° ° C., including up to about 250° C. Equivalent alloys include Ametek 936, Nilo 36 and Pernifer 36. Generally, CTEs may be measured using a dilatometer, for example a TA Instruments® DIL 832 or a thermomechanical analyzer (TMA), for example a Perkin Elmer® TMA 4000, operated according to manufacturers' instructions.

TABLE 1

| | Invar 36 composition | | | | | | | | |
|---|---|---|---|---|---|---|---|---|---|
| | Ni | Fe | Mo | C | Cu | Mn | Si | P | S | Cr |
| MIN (wt. %) | 35.0 | — | — | — | — | — | — | — | — | — |
| MAX (wt. %) | 37.0 | Balance | 0.5 | 0.1 | 0.5 | 0.6 | 0.35 | 0.025 | 0.025 | 0.5 |

Invar 42 has a relatively higher CTE (about $5.3\times10^{-6}$ $K^{-1}$ C) than Invar 36 at relatively lower temperatures but a relatively lower CTE than Invar 36 at relatively higher temperatures and is thus typically used for hard tooling for thermal cycling above 200° C., for example up to 300° C. Equivalent alloys include Nickel alloy 42, Nilo 42, Pernifer 42, Werkstoff Nr. 1.3917, UNS K94100.

TABLE 2

| | Invar 42 composition | | | | | | | | |
|---|---|---|---|---|---|---|---|---|---|
| | Ni | Fe | Mo | C | Cu | Mn | Si | P | S | Cr |
| MIN (wt. %) | 40.0 | — | — | — | — | — | — | — | — | — |
| MAX (wt. %) | 41.0 | Balance | — | 0.05 | — | 0.40 | 0.20 | 0.025 | 0.025 | 0.5 |

Similar alloys include FeNiCo alloys, for example Kovar or Dilver P, similar to those of composites such as borosilicate glass for GRP, thereby reducing CTE mismatch therebetween.

Cold Spraying

The method comprises hermetically sealing the precursor by cold spraying the layer on the second face using particles comprising the second metal. It should be understood that the cold sprayed layer is a hermetically sealing layer, not having any perforations therethrough, for example having a leak rate low enough to maintain a desired vacuum level of, for example, 500 mbar, 100 mbar or better.

Cold spraying (also known as gas dynamic cold spraying) is a known coating deposition method. Particles (typically 1 to 50 μm in diameter, preferably 10 to 40 μm in diameter) are all accelerated in a supersonic gas jet (typically He and/or $N_2$) to speeds of up to 1200 $ms^{-1}$ from a spraying nozzle and impact upon a substrate, such as the second face. Upon impact, the particles are plastically deformed and bond thereto. A uniform layer is achieved by scanning or rastering the spray nozzle. Relatively thick layers may be achieved by repeated cold spraying and deposition rates may be relatively high. High pressure cold spraying (HPCS) uses nitrogen or helium at a pressure above 1.5 MPa, a flow rate of more than 2 $m^3$/min and a heating power of about 15 to 20 KW. HPCS is typically used for spraying metal particles, having diameters of 5 to 50 μm. Low pressure cold spraying (LPCS) uses compressed gas at a pressure of 0.5 to 1.0 MPa, a flow rate of 0.5 to 2 $m^3$/min and a heating power of 3 to 5 KW. LPCS may be used for spraying a mixture of metal and ceramic particles. The inclusion of a ceramic component in the mixture provides high-quality coatings with relatively low energy consumption. Unlike thermal spraying (such as plasma spraying, arc spraying, flame spraying or high velocity oxygen fuel spraying), the particles are not melted during cold spraying. Rather, the heat input during cold spray is relatively low, thereby reducing or eliminating residual stresses in the substrate and/or deformation thereof. Furthermore, the cold sprayed layers have low porosity, which is typically closed (i.e. not interconnected). In one example, the cold spraying comprises high pressure cold spraying using He, for example at a pressure above 1.5 MPa, a flow rate of more than 2 m$^3$/min and a heating power of about 15 to 20 kW.

In one example, hermetically sealing the precursor by cold spraying the layer on the second face using particles comprising the second metal comprises cold spraying only the layer on the second face using particles comprising the second metal. That is, the method excludes cold spraying a layer on the first face.

In one example, hermetically sealing the precursor by cold spraying the layer on the second face comprises selectively cold spraying the layer on the second face, for example selectively cold spraying on selected areas of the second face. In this way, the second face may be selectively cold sprayed, for example to provide, for example only provide, the layer overlaying welds and/or a through-thickness and/or an interconnected crack and/or porosity, extending between the first face and the second face. In one example, the method comprises non-destructive testing, NDT, of the precursor, for example using magnetic particle inspection, ultrasonic testing and/or radiography, identifying a defect, for example a through-thickness and/or an interconnected crack and/or porosity, and selectively cold spraying the layer on the second face corresponding with the identified defect, thereby hermetically sealing the precursor.

In one example, hermetically sealing the precursor by cold spraying the layer on the second face comprises cold spraying the layer on at least 50%, 60%, 70%, 80%, 90%, 95%, 96%, 97%, 98% or 99% by area, of the second face. In one example, hermetically sealing the precursor by cold spraying the layer on the second face comprises cold spraying the layer on the entire area of the second face.

In one example, cold spraying the layer on the second face comprises cold spraying the layer directly on the second face i.e. without an interlayer therebetween. In one example, cold spraying the layer on the second face comprises cold spraying the layer indirectly on the second face i.e. with an interlayer therebetween.

Layer

It should be understood that the cold sprayed layer is a hermetically sealing layer, not having any perforations therethrough. In one example, the layer does not have a perforation, for example a through-thickness and/or an interconnected crack and/or porosity, therethrough.

In one example, the layer has a thickness in a range from 0.5 mm to 20 mm, preferably in a range from 1 mm to 10 mm, more preferably in a range from 1.5 mm to 8 mm, for example about 2 mm. It should be understood that the thickness of the layer is sufficient to provide the hermetic sealing. Generally, a relatively thinner layer is preferred, thereby reducing cost and/or mass.

Particles Comprising Second Metal

The method comprises hermetically sealing the precursor by cold spraying the layer on the second face using particles comprising the second metal, as described above. In one example, the particles consist of the second metal.

It should be understood first metal and the second metal are mutually compatible since the respective coefficients of thermal expansion of the first metal and the second metal are within a factor of 5, for example at a curing temperature of a GRP or CFC part and/or at a thermal cycling temperature during polymerization of a GRP or CFC part, for example at a temperature of 100° C., 125° C., 150° C., 175° C., 200° ° C., 225° C., 230° C. and/or 250° C. and/or in a temperature in a range from 50° C. to 300° C., preferably in a range from 150° C. to 275° C., more preferably in a range from 200° C. to 250° C. That is, the first metal the second metal may be compositionally compatible, for example compositions of the first metal and the second metal are similar or the same, as understood by the skilled person. In other words, the first metal and the second metal have matched chemistry. Additionally and/or alternatively, the respective CTEs of the first metal and the second metal are similar (for example within a factor of 10, 5, 4, 3, 2, 1.5, 1.4, 1.3, 1.25, 1.2 or 1.1) or the same, for example over an expected thermal cycling temperature range. In one example, the second metal and the first metal are similar. In one example, the second metal and the first metal are the same.

In one example, the second metal is as described with respect to the first metal.

Faceplate

The method comprises providing the faceplate (also known as mould surface i.e. the surface defining a shape of composite parts formed therewith) of the composite mould tool by subtractive manufacturing of the first face.

Subtractive Manufacturing

Processes of subtractive manufacturing, for example CNC machining and/or polishing, for composite mould tools are known.

In one example, the method comprises providing the faceplate of the composite mould tool by subtractive manufacturing of the first face after hermetically sealing the precursor by cold spraying the layer on the second face. That is, the subtractive manufacturing of the first face is performed after cold spraying the layer on the second face. For example, the cold spraying may be performed as a preventative step before the subtractive manufacturing, thereby warrantying vacuum integrity thereof.

In one example, the method comprises providing the faceplate of the composite mould tool by subtractive manufacturing of the first face before hermetically sealing the precursor by cold spraying the layer on the second face. That is, the subtractive manufacturing of the first face is performed before cold spraying the layer on the second face. Particularly, the method of manufacturing is amenable to this order of steps since the heat input during cold spray is relatively low, thereby reducing or eliminating residual stresses in the precursor and/or deformation thereof and hence maintaining dimensional tolerancing of the face plate.

In one example, the method comprises subtractive manufacturing of the layer on the second face. For example, the layer may be spot machined for attachment of an egg crate.

Priming

In one example, the method comprises priming the second surface before cold spraying the layer thereon. In this way, bonding of the layer to the second face is improved. It should be understood that priming comprises surface preparation, such as chemical and/or mechanical cleaning. For example, priming for cold spray may include abrasive blasting using abrasive media such as alumina powder. Such abrasive blasting may be performed using the cold spray apparatus.

Stress-Relieving

In one example, the method comprises stress-relieving the precursor having the layer on the second face before subtractive manufacturing of the first face, for example by thermal stress relieving and/or by vibrational stress relieving. In this way, residual stresses in the precursor may be further reduced or eliminated, thereby maintaining dimensional tolerancing of the face plate.

Non-Destructive Testing

In one example, the method comprises non-destructive testing, NDT, of the precursor or the composite mould tool, for example using magnetic particle inspection, ultrasonic testing and/or radiography, identifying a defect, for example a through-thickness and/or an interconnected crack and/or porosity, and selectively cold spraying the layer on the second face corresponding with the identified defect, thereby hermetically sealing the precursor or the composite mould tool. In this way, the precursor or the composite mould tool may be repaired.

Leak Testing

In one example, the method comprises leak testing, of the precursor or the composite mould tool, for example using a He sniffer, identifying a defect, for example a through-thickness and/or an interconnected crack and/or porosity, and selectively cold spraying the layer on the second face corresponding with the identified defect, thereby hermetically sealing the precursor or the composite mould tool. In this way, the precursor or the composite mould tool may be repaired.

Preferred Method

In one example, the method of manufacturing, at least in part, the composite mould tool, wherein the composite mould tool is a single-sided mould tool for a CFC aerospace component, comprises:
  obtaining the mould tool precursor having the first face and the reverse second face, wherein the precursor is formed, at least in part, from the first metal, wherein the first metal comprises and/or is Invar 36 or equivalent (complying with current versions of ASTM B388, DIN 1.3912, UNS K93600, MIL I-16598, MIL I-23011 Class 7, WS 1.3912), Invar 42 or equivalent (complying with current versions of ASTM F30, UNS K94100, DIN 1.3917, NF A54-301) and wherein the precursor comprises a perforation, for example a through-thickness and/or an interconnected crack and/or porosity, extending between the first face and the second face;
  hermetically sealing the precursor by high pressure cold spraying using He, for example at a pressure above 1.5 MPa, a flow rate of more than 2 m$^3$/min and a heating power of about 15 to 20 KW, the layer only and directly on the second face using particles consisting of the second metal, wherein the first metal and the second metal are similar or the same; and
  providing the faceplate of the composite mould tool by subtractive manufacturing of the first face, before or after hermetically sealing the precursor by cold spraying the layer on the second face.

Method of Repairing

A second aspect provides a method of repairing a composite mould tool having a faceplate provided by a first face and a reverse second face, wherein the tool comprises a first metal, the method comprising:
  hermetically sealing the composite mould tool by cold spraying a layer on the second face using particles comprising a second metal, wherein the first metal and the second metal are mutually compatible.

In this way, the composite mould tool, for example a composite mould tool that does not have vacuum integrity such as a previously manufactured and/or defective composite mould tool, is hermetically sealed by cold spraying the layer on the second face, thereby providing a composite mould tool having vacuum integrity. In this way, previously manufactured and/or defective composite mould tools may be repaired for use, thereby extending longevities thereof and/or avoiding scrapping thereof.

The composite mould tool, the faceplate, the first face, the second face, the first metal, the sealing, the cold spraying, the layer, the particles and/or the second metal may be as described with respect to the first aspect. The method may include any of the steps described with respect to the first aspect.

In one example, hermetically sealing the composite mould tool by cold spraying the layer on the second face using the particles comprising the second metal comprises hermetically sealing the composite mould tool by cold spraying the layer only on the second face using the particles comprising the second metal. That is, the method excludes cold spraying a layer on the first face.

Tool

The third aspect provides a composite mould tool having a faceplate provided by a first face and a reverse second face, wherein the tool comprises a first metal, wherein the tool comprises a cold sprayed, hermetically sealing layer on the second face, wherein the layer comprises a second metal, wherein the first metal and the second metal are mutually compatible.

The composite mould tool, the faceplate, the first face, the second face, the first metal, the sealing and/or the cold sprayed, hermetically sealing layer may be as described with respect to the first aspect and/or the second aspect. The tool may include any of the features described with respect to the first aspect and/or the second aspect.

In one example, the tool comprises the cold sprayed, hermetically sealing layer only on the second face. That is, the tool does not comprise a cold sprayed, hermetically sealing layer on the first face.

Use

The fourth aspect provides use of a cold sprayed Fe—Ni alloy layer on a reverse second face of a Fe—Ni alloy composite mould tool, having a faceplate provided by a first face and the reverse second face, to hermetically seal the tool.

The cold sprayed Fe—Ni alloy layer, the second face, the composite mould tool, Fe—Ni alloy composite mould tool, the faceplate and/or the sealing may be as described with respect to the first aspect. The use may include any of the steps described with respect to the first aspect and/or the second aspect and/or any of the features described with respect to the first aspect, the second aspect and/or the third aspect.

In one example, a cold sprayed Fe—Ni alloy layer is only on the reverse second face. That is, a cold sprayed Fe—Ni alloy layer is not on the first face.

Composite Part

A fifth aspect provides a method of forming a composite part comprising manufacturing, at least in part, a corresponding composite mould tool (i.e. corresponding to the composite part) according to the first aspect, repairing a corresponding composite mould tool according to the second aspect or using a corresponding composite mould tool according to the third aspect.

In one example, the composite part comprises and/or is an aerospace component.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Figure 1:
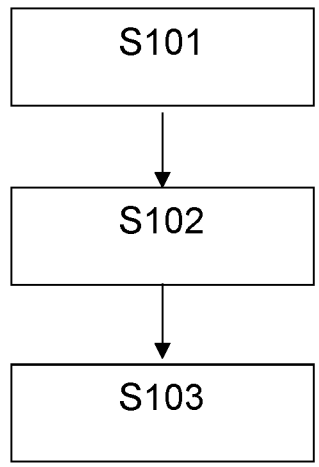
FIG. 1 schematically depicts a method according to an exemplary embodiment.

FIG. 1 schematically depicts a method according to an exemplary embodiment. The method is of manufacturing, at least in part, a composite mould tool.

At S101, the method comprises obtaining a mould tool precursor having a first face and a reverse second face, wherein the precursor comprises a first metal.

At S102, the method comprises hermetically sealing the precursor by cold spraying a layer on the second face using particles comprising a second metal, wherein the first metal and the second metal are mutually compatible.

At S103, the method comprises providing a faceplate of the composite mould tool by subtractive manufacturing of the first face.

The method may include any of the steps described with respect to the first aspect.

In more detail, metallic CFC mould tools are typically manufactured via CNC machining of castings, welded fabrications or from billet materials but often fail to meet the minimum vacuum standards required to support the successful manufacture of aircraft components, for example. Existing methods of repair via welding are complex, expensive and risky due to the potential to induce non recoverable distortion.

The risk to vacuum integrity of any casting, weld or billet only increases the more the casting, weld or billet is machined and the nearer the tool is to the net surface condition, the greater the risk for any conventional welded repair strategy, Metallic cold spraying of a matching die material onto the rear face of the tool permanently repairs and/or recovers tools having vacuum leaks. The ability to use a matched material to the parent tool material avoids differential expansion and distortion of the tool during the component manufacture and thermal cure cycle—this would cause the component to be cured to the wrong shape. Cold spray as a metal deposition process is much less prone to induce distortion in the tool and is also a far more efficient way to cover larger areas than welding.

The method is potentially applicable to all metallic materials currently used to manufacture CFC mould tools e.g. Invar 36, steel and aluminium alloys. Invar 36 casting and welding have proved especially difficult to prevent and resolve leaks.

Deployment of a cold sprayed layer of material on to the back face of a tool prior to the CNC machining is an effective de-risk strategy that would be especially suited to cast tooling thus enabling confidence to grow in this potentially lower cost solution for Invar 36 CFC mould tooling. The same approach may be deployed onto the back face of the welded regions of complex plate fabrications prior to machining.

There are also some analogous applications where vacuum integrity is crucial e.g. vacuum route tooling with issues on castings, billet integrity and the ability to modify the tools geometry within the vacuum region and still maintain vacuum integrity.

Figure 2:
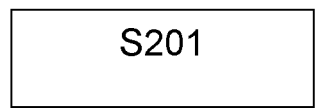
FIG. 2 schematically depicts a method according to an exemplary embodiment.

FIG. 2 schematically depicts a method according to an exemplary embodiment. The method is of repairing a composite mould tool having a faceplate provided by a first face and a reverse second face, wherein the tool comprises a first metal.

At S201, the method comprises hermetically sealing the composite mould tool by cold spraying a layer on the second face using particles comprising a second metal, wherein the first metal and the second metal are mutually compatible.

The method may include any of the steps described with respect to the first aspect and/or the second aspect.

Figure 3:
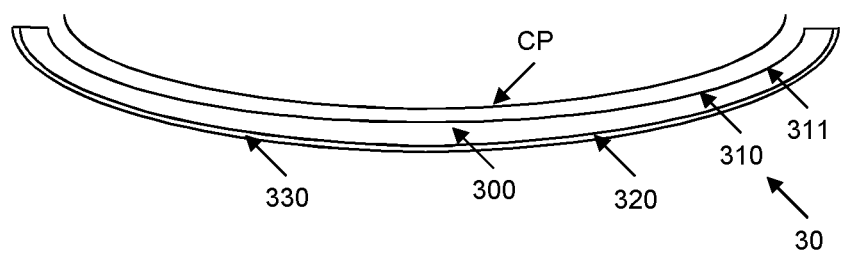
FIG. 3 schematically depicts a cross-section of a composite mould tool according to an exemplary embodiment.

FIG. 3 schematically depicts a cross-section of a composite mould tool 30 according to an exemplary embodiment.

The composite mould tool 30, for forming a composite part CP, has a faceplate 311 provided by a first face 310 and a reverse second face 320, wherein the tool 30 comprises a first metal, wherein the tool 30 comprises a cold sprayed, hermetically sealing layer 330 on the second face 320, wherein the layer comprises a second metal, wherein the first metal and the second metal are mutually compatible.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A method of manufacturing a composite mould tool, the method comprising:
    obtaining a mould tool precursor having a first face and a reverse second face, wherein the precursor comprises and/or is a first metal, wherein the precursor comprises a perforation extending between the first face and the second face (S101);
    hermetically sealing the precursor by cold spraying a layer on the second face using particles comprising and/or of a second metal, wherein the respective coefficients of thermal expansion of the first metal and the second metal are within a factor of 5, wherein the layer does not have any perforations therethrough and wherein the precursor is the mould tool before the layer is cold sprayed on the second face (S102); and
    providing a faceplate of the composite mould tool by subtractive manufacturing of the first face (S103);
    thereby manufacturing the mould tool having the faceplate provided by subtractive manufacturing of the first face and the reverse second face hermetically sealed by cold spraying the layer thereon.

2. The method according to claim 1, wherein obtaining the precursor comprises casting, thermomechanically forming and/or fabricating from the first metal.

3. The method according to claim 1, wherein the first metal and/or the second metal is an Fe—Ni alloy.

4. The method according to claim 1, wherein the layer has a thickness in a range from 1 mm to 20 mm.

5. The method according to claim 1, wherein the respective coefficients of thermal expansion of the first metal and the second metal are within a factor of 2.

6. The method according to claim 5, wherein the second metal and the first metal are the same.

7. The method according to claim 1, comprising priming the second surface before cold spraying the layer thereon.

8. The method according to claim 1, wherein hermetically sealing the precursor by cold spraying the layer on the second face comprises selectively cold spraying the layer on the second face.

9. The method according to claim 1, wherein hermetically sealing the precursor by cold spraying the layer on the second face comprises cold spraying the layer on the entire area of the second face.

10. The method according to claim 1, comprising providing the faceplate of the composite mould tool by subtractive manufacturing of the first face before hermetically sealing the precursor by cold spraying the layer on the second face.

11. The method according to claim 1, comprising providing the faceplate of the composite mould tool by subtractive manufacturing of the first face after hermetically sealing the precursor by cold spraying the layer on the second face.

12. The method according to claim 1, comprising subtractive manufacturing of the layer on the second face.

13. The method according to claim 1, comprising stress-relieving the precursor having the layer on the second face before subtractive manufacturing of the first face.

14. The method according to claim 1, wherein the composite mould tool is for an aerospace component.

15. A method of repairing a composite mould tool to be repaired according to claim 1, wherein the precursor is the composite mould tool to be repaired.

* * * * *